US007812266B2

(12) United States Patent
Rocks et al.

(10) Patent No.: US 7,812,266 B2
(45) Date of Patent: Oct. 12, 2010

(54) BUSHING AND A METHOD FOR PRODUCING THE SAME

(75) Inventors: Jens Rocks, Freienbach (CH); Vincent Tilliette, Zürich (CH); Gerd Chalikia, Ludvika (SE); Roger Hedlund, Ludvika (SE); Michael Gabriel, Seuzach (CH)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 12/487,336

(22) Filed: Jun. 18, 2009

(65) Prior Publication Data

US 2009/0288878 A1 Nov. 26, 2009

Related U.S. Application Data

(63) Continuation of application No. PCT/CH2006/000726, filed on Dec. 20, 2006.

(51) Int. Cl.
*H02G 3/18* (2006.01)

(52) U.S. Cl. .................. 174/665; 174/650; 174/152 R; 174/137 R; 16/2.1; 16/2.2

(58) Field of Classification Search ................. 174/650, 174/665, 152 R, 153 G, 152 G, 668, 669, 174/137 R, 153 R; 16/2.1, 2.2; 264/262; 248/56; 439/604, 587, 274, 275
See application file for complete search history.

(56) References Cited

U.S. PATENT DOCUMENTS 3,861,777 A * 1/1975 Clark ..................... 174/152 R
4,965,407 A * 10/1990 Hamm ................... 174/152 R
6,610,933 B2 * 8/2003 Baker et al. ............. 174/152 R
2002/0104679 A1 8/2002 Krol et al.

FOREIGN PATENT DOCUMENTS

EP 0 075 471 A1 3/1983
GB 620822 A 3/1949

OTHER PUBLICATIONS

International Search Report (PCT/ISA/210) dated Aug. 10, 2007.
Written Opinion of the International Searching Authority (PCT/ISA/237) dated Aug. 10, 2007.

* cited by examiner

*Primary Examiner*—Angel R Estrada
(74) *Attorney, Agent, or Firm*—Buchanan Ingersoll & Rooney PC

(57) ABSTRACT

A bushing is disclosed with a duct for accommodating a conductor which is surrounded by an electrical field grading insulation. The bushing includes a core with a shell encapsulating the grading insulation and a flange surrounding the shell and carrying through holes distributed over its circumference for allowing the bushing to be attached to a wall. The shell and the flange can be in one piece and include an insulating matrix material. The through holes can be surrounded by metal inserts each forming an annular surface flush with a surface of the flange. A test tap can include a contact pin which is electrically conductively connected to an outermost layer of the grading insulation and surrounded by a contact ring connected to every second metal insert by connection wires for grounding the contact pin via the contact ring when the test tap is not in use and covered. The core can be produced by filling a mold with the liquid matrix material after components of the grading insulation and other parts have been fixed in the liquid matrix material.

21 Claims, 3 Drawing Sheets

BUSHING AND A METHOD FOR PRODUCING THE SAME

RELATED APPLICATION

This application claims priority as a continuation application under 35 U.S.C. §120 to PCT/CH2006/000726 filed as an International Application on Dec. 20, 2006 designating the U.S., the entire content of which is hereby incorporated by reference in its entirety.

FIELD

The disclosure concerns a bushing and a method for producing such bushing.

BACKGROUND INFORMATION

Bushings are known, for example, as electrical condenser bushings used in medium and high voltage electrical installations for leading a conductor through a grounded barrier (e.g., a metal wall of a transformer, tank or substation housing or similar).

Known bushings can include flanges made of metal, in particular of aluminium and can be expensive. In particular, the manufacturing process can be rather complicated. First, a core comprising an electrical field grading insulation and a test tap connection point is produced, e.g., by moulding and finished by machining. The expensive metal flange is produced separately and afterwards fixed to the core, such as with an adhesive, and an electrical connection with the test tap connection point established.

SUMMARY

A bushing is disclosed comprising: a rotationally symmetrical core surrounding an axial duct for accommodating a conductor; a grading insulation surrounding the axial duct; a plurality of conductor layers which are electrically insulated from each other, an innermost of the conductor layers being electrically conductively connected to a contact element arranged in the axial duct for establishing contact with the conductor; a shell having an insulating matrix material with, at a circumference, a test tap with a test contact electrically conductively connected to an outermost of the conductor layers of the grading insulation; a grounding contact electrically connectable to the test contact and with a flange laterally projecting and circumferentially surrounding the shell, which flange has axial through holes for accommodating bolts for mounting the bushing, a first side of the flange being adjacent to a mounting side of the bushing, wherein the flange is in one piece with the shell and is formed at least in part of the insulating matrix material and at least one metal insert at least partially embedded in the insulating matrix material adjacent to the through holes such that the at least one metal insert forms at least part of a surface of the flange surrounding the through holes on a second side of the flange opposite the first side of the flange; and at least one electrically conductive connection element which connects the grounding contact with the at least one metal insert.

A method of producing a bushing is disclosed having a rotationally symmetrical core surrounding an axial duct for accommodating a conductor, a grading insulation surrounding the axial duct, a plurality of conductor layers which are electrically insulated from each other, a shell having an insulating matrix material with a test contact connected to an outermost of the conductor layers of the grading insulation, a flange in one piece with the shell formed at least in part of the insulating matrix material, with at least one metal insert at least partially embedded in the insulating matrix material adjacent to through holes such that the at least one metal insert forms at least part of a surface of the flange surrounding the through holes on a second side of the flange opposite a mounting side of the bushing, and at least one electrically conductive connection element which connects a grounding contact with the at least one metal insert, the method comprising: placing at least components of the grading insulation, the test contact, the at least one metal insert and the at least one connection element in a mould; filling the mould with the insulating matrix material in a liquid form; allowing the insulating matrix material to harden; and removing the bushing from the mould.

BRIEF DESCRIPTION OF THE DRAWINGS

The disclosure will be explained with reference to the following figures which show an exemplary embodiment, wherein.

DETAILED DESCRIPTION

An exemplary bushing according to the disclosure can be robust and can be reliably fixed to a wall while also establishing a desired electrically conductive connection of a grounding contact with the bushing.

A particularly simple and cost-efficient way of producing a bushing is also disclosed where, after positioning elements of a grading insulation and other components in a mould, the bushing, including the flange, can be completed in substantially one shot by filling of the mould with insulating matrix material in liquid form.

According to the disclosure, an exemplary flange is in one piece with the core, comprising the same insulating matrix material. No machining is required, and production costs can be considerably reduced. However, the surface of a plastic flange can be too soft to withstand high mechanical loads exerted on it by bolts used to mount the bushing to, e.g., any kind of plane, a housing or a wall. Also, while the metal flange of known generic bushings can be employed for grounding the test contact of the test tap incorporated in the housing, establishing an electrically conductive connection between the grounding contact and the wall via the bolts used for mounting the bushing to the same, such a connection is not automatically present in a bushing with a flange comprising an electrically insulating material.

Figure 1:
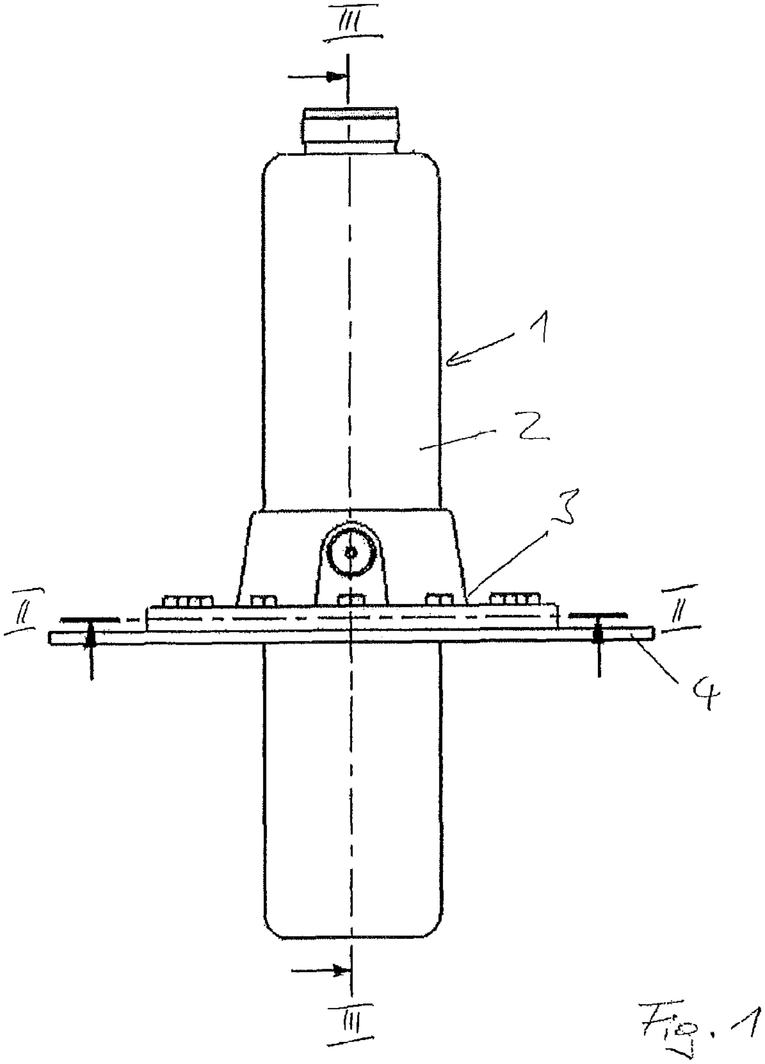
FIG. 1 shows a side view of an exemplary bushing according to the disclosure and part of a wall the bushing.
Figure 3:
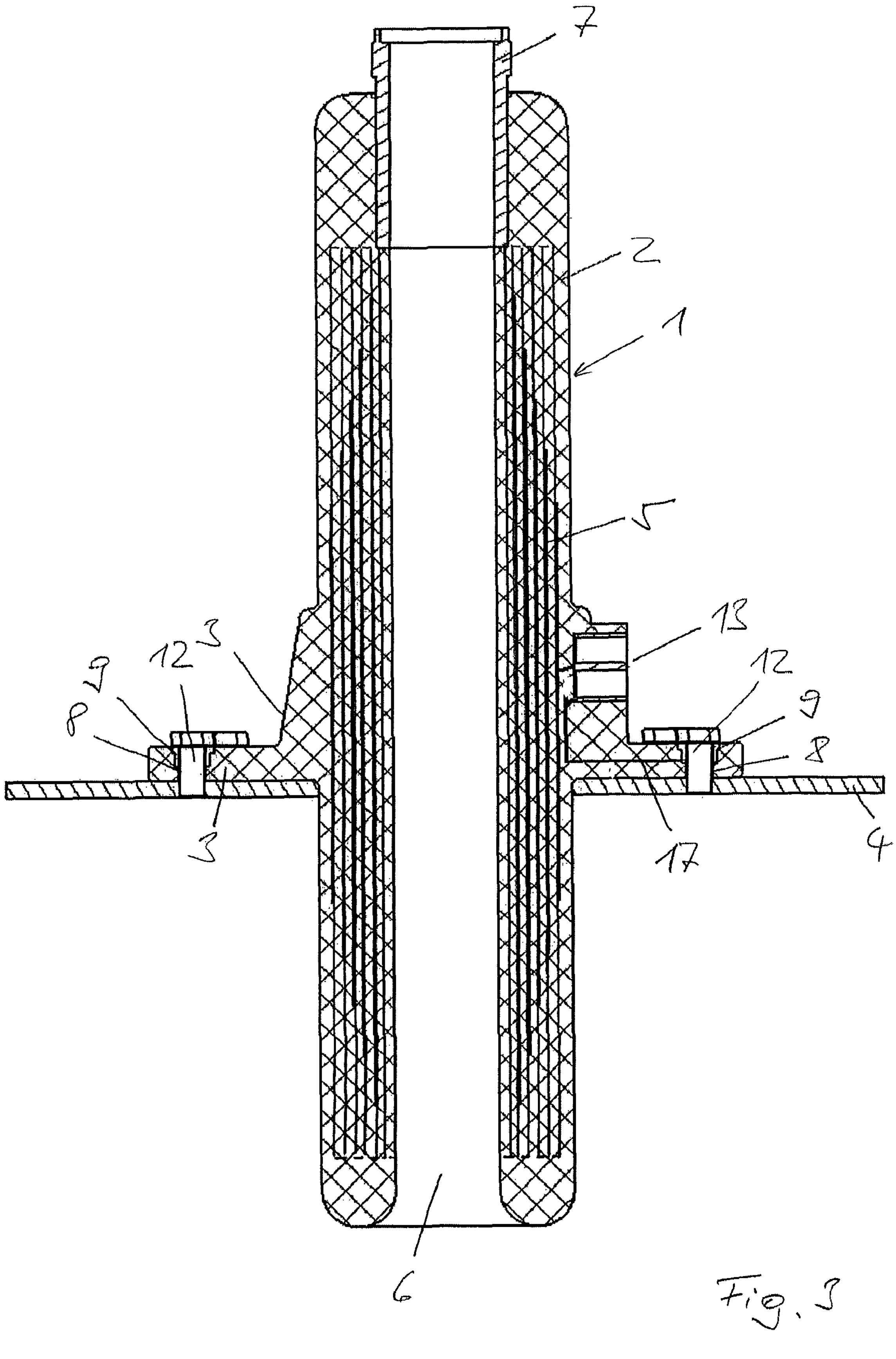
FIG. 3 shows a longitudinal section along III-III in FIG. 1.

FIG. 1 shows an exemplary bushing which includes a core 1 with a cylindrical shell 2 (e.g., roughly cylindrical) surrounded by a flange 3 with a sleeve surrounding the shell 2 and an annular part for attaching the bushing to a plane grounded wall 4 or the like (e.g., the metal wall of a transformer or substation housing). The shell 2 and the flange 3 can be in one piece and include an insulating matrix material, such as a plastic material (e.g., a polymer or mixture of polymers or an insulating resin, preferably mixed with an inorganic filler material like silica, alumina or boron nitride). A plane first side, or face, of the flange 3 is in contact with the wall 4 or a housing. The shell 2 encapsulates an electrical field grading insulation 5 (FIG. 3), which can be configured as a winding made from a web of porous material, such as paper or fiber fabric, impregnated with the matrix material, with a plurality of cylindrical coaxial or wound conductor layers configured as sheets (e.g., metal foil) each placed between subsequent turns of the winding. The grading insulation 5 surrounds an axial duct 6 for accommodating a conductor rod. At one end of the duct 6 a sleeve 7 is provided which serves as a contact element for contacting the conductor rod. The sleeve 7 includes (e.g., consists of) metal (e.g., aluminium), and is electrically conductively connected to an innermost conductor layer of the grading insulation 5.

Figure 2:
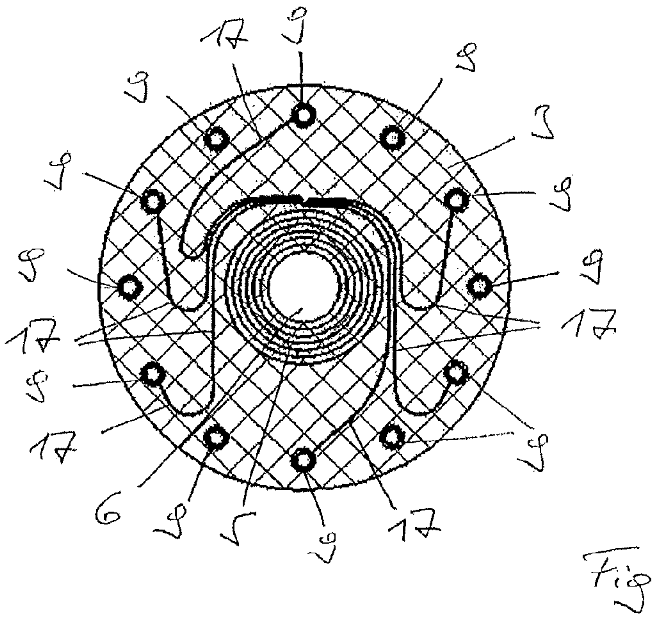
FIG. 2 shows a cross section along II-II in FIG. 1.
Figure 4:
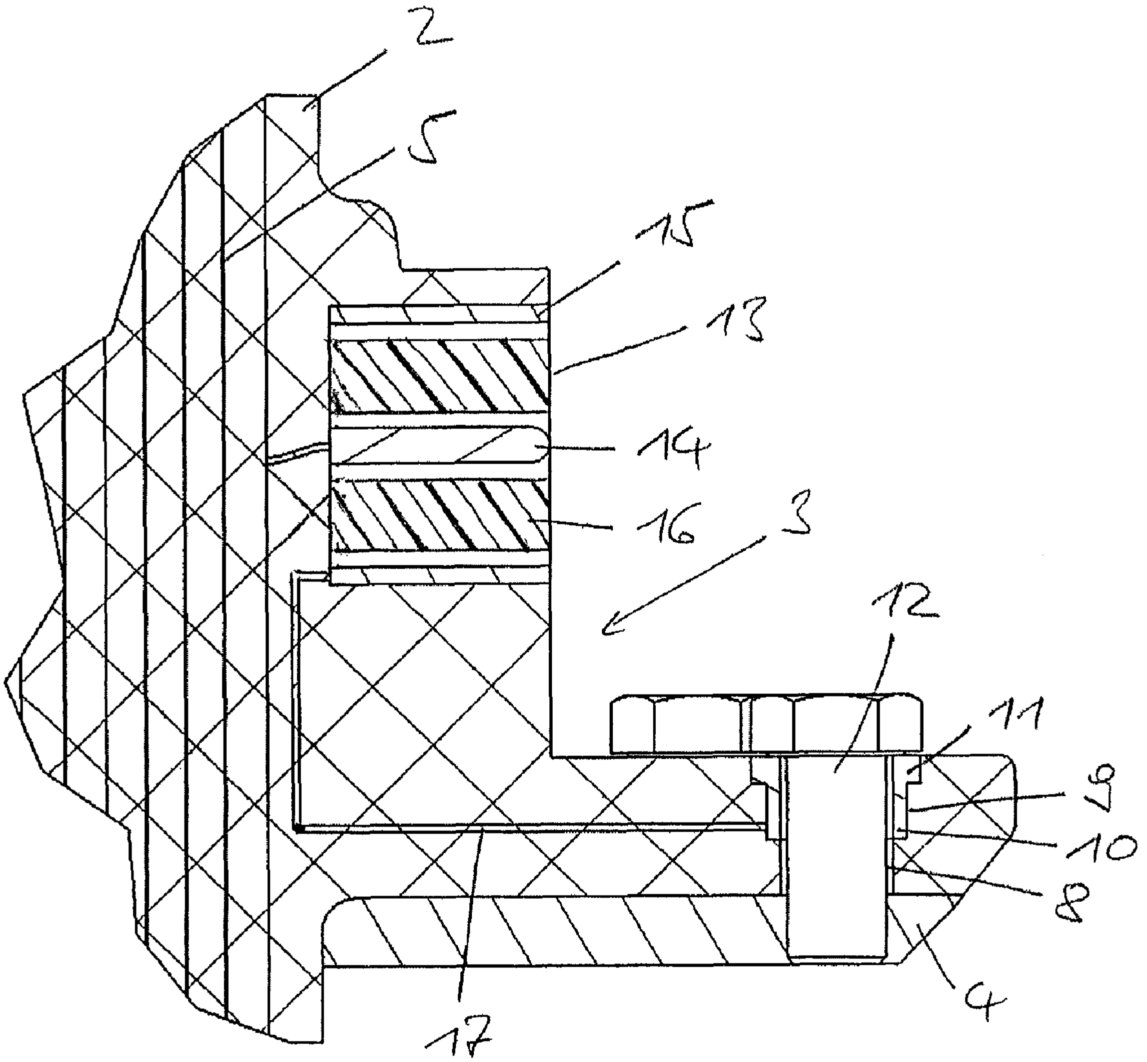
FIG. 4 shows a portion of FIG. 3, enlarged and with additional details.

The flange 3, which can project laterally and circumferentially surround the outer shell 2, can have a plurality of axial through holes 8 equally distributed along its circumference (e.g., twelve of them as shown in FIG. 2). In an exemplary embodiment, every one of the through holes 8 is formed by a metal insert 9 partially embedded in the flange 3, each comprising (FIG. 4) a threaded ring 10 surrounding the through hole 8 and carrying at its end proximal to a second face of the flange 3 opposite the first face a laterally outward projecting rim 11 that exhibits an annular surface flush with the said second face of the flange 3. In this example, every one of the rings 10 can accommodate a threaded bolt 12, the head of which abuts against the annular surface of the rim 11 and which extends through the through hole 8 and into an aligned threaded hole in the wall 4. When the bolts 12 are tightened, the pressure exerted by their heads on the second face of the flange 3 acts on the annular surfaces of the rims 11. As the annular surfaces are formed by the metal inserts 9 which may comprise, e.g., aluminium or steel, they are hard and wear-resistant and considerable force may be applied for ensuring a reliable mechanical connection between the flange 3 and the wall 4 without risk of damage to the surface of the flange 3. The flange can be annular, but any other design suitable for mounting the flange with its first side, which is to be mounted to the wall 4 or housing, can be used (e.g. the flange having an outer rectangular form).

On the sleeve of the flange 3 a test tap 13 is provided which projects radially outward from the cylindrical shell 2. The tast tap 13 comprises a test contact shaped as a contact pin 14 which can be electrically conductively connected to the outermost conductor layer of the grading insulation 5. The contact pin 14 is coaxially surrounded at a distance by a contact ring 15 which serves as a grounding contact. An insulating ring 16 separates the contact ring 15 from the contact pin 14 to prevent flashovers. In an exemplary embodiment, every second one (or every one) of the metal inserts 9 can be electrically conductively connected to the contact ring 15 by a connection element, e.g., a connection wire 17. The connection wires 17 each comprise an electrically conductive material, such as metal, e.g., aluminium or copper. They can have equal lengths and cross sections so as to have, for example, approximately (e.g., ±1% or ±10%) equal electrical resistances.

The test tap 13 can be covered by a metal cap which electrically conductively connects the contact pin 14 to the contact ring 15 so the outermost conductor layer of the grading insulation 5 is grounded. When the cap is removed the contact pin 14 is electrically disconnected from the contact ring 15 and can be connected to an input of a measuring instrument, e.g., a voltmeter, and electrical measurements carried out for diagnostic and other purposes.

The bushing as described can be produced according to an exemplary method as follows:

The winding for the electrical field grading insulation 5 can be wound from a web of porous material, with the sheets of metal foil inserted between subsequent turns (or the porous material comprises metal coatings or a net shaped or meshed material is used), and then fixed inside a mould together with the diverse metal parts (e.g., the sleeve 7, the metal inserts 9, the contact pin 14, the grounding contact 15, the connection wires 17 and other electrical connections). Then the mould is filled with liquid insulating matrix material (e.g., a plastic material, such as a polymer or mixture of polymers or resin, preferably with an admixture of inorganic filler material like silica, alumina, dolomite, wollastonite or boron nitride or the like as described above. This step can be carried out in different ways (e.g., involving vacuum casting or, for example, automated pressure gelation or injection moulding). The matrix material forms the shell 2 and the flange 3 and at the same time impregnates the porous material of the winding to complete the formation of the grading insulation 5. Afterwards the matrix material can be left to harden. When it has solidified sufficiently, the mould can be opened and the bushing removed.

There are many ways of modifying the above-described design and method within the scope of the disclosure. For example, the metal inserts can be of various shapes (e.g., each may comprise a ring extending through the through hole to the first face of the flange and carrying a second rim at the end proximal to the same). It is also possible to replace the plurality of metal inserts by a single metal insert (e.g., in the shape of a ring essentially following the circumference of the flange and forming an annular surface interrupted by the through holes). Connection cables or massive connection pieces may be used instead of connection wires and various materials can be employed, provided that they offer sufficient electrical conductivity. The grounding contact can be connected to the at least one contact piece at three or more positions which are for example substantially (essentially) equally distributed over the circumference of the flange, as in this way an approximately axially symmetrical distribution of currents and electromagnetic fields can be achieved. The shape of the core can be, at least in part, frustoconical. The flange can be reinforced by ribs or reinforcing materials, e.g., glass fibers.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 core
2 shell
3 flange
4 wall
5 grading insulation
6 duct
7 sleeve
8 through hole
9 metal insert
10 ring
11 rim
12 bolt
13 test tap
14 contact pin
15 contact ring

16 insulating ring

17 connection wire

What is claimed is:

1. A bushing comprising:

a rotationally symmetrical core surrounding an axial duct for accommodating a conductor;

a grading insulation surrounding the axial duct;

a plurality of conductor layers which are electrically insulated from each other, an innermost of the conductor layers being electrically conductively connected to a contact element arranged in the axial duct for establishing contact with the conductor;

a shell having an insulating matrix material with, at a circumference, a test tap with a test contact electrically conductively connected to an outermost of the conductor layers of the grading insulation;

a grounding contact electrically connectable to the test contact;

a flange laterally projecting and circumferentially surrounding the shell, which flange has axial through holes for accommodating bolts for mounting the bushing, a first side of the flange being adjacent to a mounting side of the bushing, wherein the flange is in one piece with the shell and is formed at least in part of the insulating matrix material and at least one metal insert at least partially embedded in the insulating matrix material adjacent to the through holes such that the at least one metal insert forms at least part of a surface of the flange surrounding the through holes on a second side of the flange opposite the first side of the flange; and at least one electrically conductive connection element which connects the grounding contact with the at least one metal insert.

2. A bushing according to claim 1, wherein the conductor layers are cylindrical, and are coaxial or wound, and wherein there is one metal insert for every through hole, each metal insert comprising a ring at least partially surrounding a respective through-hole.

3. A bushing according to claim 2, wherein at least at an end proximal to the second side of the flange, each ring is provided with a laterally outward projecting rim having a surface flush with the second side of the flange.

4. A bushing according to claim 2, wherein each ring is, at both ends, provided with a laterally outward-projecting rim, each rim having a surface flush with one of the first and second sides of the flange.

5. A bushing according to claim 1, comprising:

at least three connection elements each connecting the grounding contact with the at least one metal insert.

6. A bushing according to claim 5, wherein the at least three connection elements have approximately equal electrical resistances.

7. A bushing according to claim 1, wherein the test contact is shaped as a contact pin.

8. A bushing according to claim 7, wherein the grounding contact is shaped as a contact ring coaxially surrounding the contact pin.

9. A bushing according to claim 1, wherein the test tap comprises:

a removable metal cap which, when the test tap is not being used, is in contact with the grounding contact as well as with the test contact to provide an electrically conductive connection between them.

10. A bushing according to claim 1, wherein the grading insulation comprises:

a winding of porous web material impregnated with the insulating matrix material, with the conductor layers each formed by a sheet of electrically conductive material placed between subsequent turns of the winding.

11. A bushing according to claim 1, wherein the insulating matrix material comprises:

at least one polymer or a resin.

12. A bushing according to claim 11, wherein the at least one polymer or resin is mixed with an inorganic filler material.

13. A bushing according to claim 8, wherein the test tap comprises:

a removable metal cap which, when the test tap is not being used, is in contact with the grounding contact as well as with the test contact so as to provide an electrically conductive connection between them.

14. A bushing according to claim 13, wherein the grading insulation comprises:

a winding of porous web material impregnated with the insulating matrix material, with the conductor layers each formed by a sheet of electrically conductive material placed between subsequent turns of the winding.

15. A bushing according to claim 14, wherein the web material is paper or fiber fabric.

16. A bushing according to claim 15, wherein the insulating matrix material comprises:

at least one polymer or a resin, mixed with an inorganic filler material containing at least one of silica, alumina or boron nitride.

17. A method of producing a bushing having a rotationally symmetrical core surrounding an axial duct for accommodating a conductor, a grading insulation surrounding the axial duct, a plurality of conductor layers which are electrically insulated from each other, a shell having an insulating matrix material with a test contact connected to an outermost of the conductor layers of the grading insulation, a flange in one piece with the shell formed at least in part of the insulating matrix material, with at least one metal insert at least partially embedded in the insulating matrix material adjacent to through holes such that the at least one metal insert forms at least part of a surface of the flange surrounding the through holes on a second side of the flange opposite a mounting side of the bushing, and at least one electrically conductive connection element which connects a grounding contact with the at least one metal insert, the method comprising:

placing at least components of the grading insulation, the test contact, the at least one metal insert and the at least one connection element in a mould;

filling the mould with the insulating matrix material in a liquid form;

allowing the insulating matrix material to harden; and removing the bushing from the mould.

18. A method according to claim 17, comprising:

filling the mould with the insulating matrix material during a filling step involving at least one of vacuum casting, automated pressure gelation, injection moulding and compression moulding.

19. A method according to claim 17, wherein the insulating matrix material is at least one polymer or a resin.

20. A method according to claim 19, wherein the insulating matrix comprises an admixture of inorganic filler material.

21. A method according to claim 20, wherein the inorganic film material is selected from the group consisting of silica, alumina and boron nitride.

* * * * *